Patented Sept. 6, 1949

2,481,100

UNITED STATES PATENT OFFICE 2,481,100

ADHESIVE COMPOSITION

Arthur L. Fox, Easton, Pa., assignor to General Aniline & Film Corporation, New York, N. Y., a corporation of Delaware No Drawing. Application November 6, 1947, Serial No. 784,505

2 Claims. (Cl. 260—8)

This invention relates to a concentrated aqueous dispersion of polymeric vinyl ethers, particularly adapted to be readily mixed with relatively large amounts of water in the formulation of agricultural sprays and when so used, to function as a sticking agent for the active components of the spray.

Many active inorganic and organic bactericides and fungicides are applied to plants in the form of an aqueous spray in order to provide uniform distribution of the insecticide or fungicide on the foliage of the plants being sprayed. However, it is well known that many of the toxic materials which are employed in agricultural sprays have very little adhesion for the plant, so that a considerable amount of the active components of the spray are lost, due to run-off of the spray from the foliage and other parts of the plant and also such material as is deposited on the plant from the spray is frequently readily washed off by rain, so that on weathering the beneficial effects of the spraying rapidly disappeared.

Many efforts have been given to improving the physical properties of the sprays employed in agriculture, so that better results could be obtained and it is now quite common practice to incorporate in agricultural sprays some form of an adhesive composition which functions as a sticker to retain the active insecticide or fungicide on the plant after the spray has dried. Animal and vegetable glues and various oils have been extensively used for this purpose, but are not completely satisfactory. I have discovered that certain polymeric vinyl ethers are non-toxic to a wide variety of plants and when dispersed in water and incorporated in agricultural sprays are valuable as sticking agents therein. However, these polymeric vinyl ethers are relatively difficult to emulsify or disperse in water and therefore do not lend themselves readily for use in the formulation of agricultural sprays which are generally mixed immediately before use. The present invention, therefore, is concerned with a concentrated emulsion or dispersion of polymeric vinyl ethers which is stable on storage and which may readily be incorporated in a large amount of water by mere stirring in the compound of an agricultural spray.

The polymeric vinyl ethers which have been found to be valuable as sticking agents in agricultural sprays are the polymers of lower alkyl vinyl ethers containing from 3 to 4 carbon atoms in the alkyl groups; i. e. the polymers of propyl-, isopropyl-, n-butyl- and isobutyl- vinyl ether and particularly relatively low molecular weight polymers of these vinyl ethers (i. e. which have an intrinsic viscosity of less than 1 and preferably of about 0.5) have been found to be valuable as sticking agents in agricultural sprays and have been found to be non-toxic to a wide variety of plants. While aqueous suspensions of solutions of the polymeric vinyl ethers of the type mentioned above in volatile organic solvents have heretofore been suggested for us as adhesives, such suspensions of organic solutions of these polymeric vinyl ethers are not satisfactory for use in agricultural sprays, since the presence of the volatile organic solvent is objectionable, not only from a cost standpoint and fire hazard, but also many volatile organic solvents are toxic to a wide variety of plants. In preparing the concentrated emulsion of polymeric vinyl ethers for use as a sticker in agricultural sprays, I therefore avoid the use of any organic solvent and directly emulsify the polymeric vinyl ether in water, using ammonium caseinate as the emulsifying agent. While the polymeric vinyl ether may be emulsified in water using ammonium caseinate as the emulsifying agent, I have found that on addition of many toxic substances commonly employed in agricultural sprays, there is considerable coagulation of the polymeric vinyl ether. However, this difficulty can be overcome by the addition of a small amount of powdered skimmed milk to the emulsion.

In preparing the concentrated emulsion of polyvinyl ether for use as a sticker in agricultural sprays, an ammonium caseinate dispersing paste is prepared by allowing casein to swell in approximately half the water required for dispersion. When the swelling is complete, a preservative for the casein, such as sodium benzoate, in an amount equal to about 5% by weight of the casein, is added and thereafter concentrated (28%) ammonium hydroxide is added with stirring to solubilize the casein. There is thus obtained a thick ammonium caseinate paste. The polyvinyl ether to be dispersed is then placed in a mixing machine having a mixing and kneading action (i. e. a Werner-Pfleiderer mixer or a Baker-Perkins mixer) and the dispersing paste of ammonium caseinate slowly added thereto. After complete addition of the dispersing paste, an inversion takes place, resulting in the formation of a stiff white paste. In case inversion does not take place immediately after the complete addition of the dispersing agent, the addition of a small amount of water will bring it about. The thus-obtained paste should then be further diluted by the slow addition of further quantities of water, until the concentration of the polymer amounts to 40% to 45% of the total solids of the dispersion. At this dilution, it has been found that the dispersion can be diluted quickly and easily with large volumes of water when making up an agricultural spray, while at the same time the concentrated dispersion is stable and does not separate on storage under ordinary conditions. The following specific example illustrates a preferred embodiment of the present invention:

Example 134 grams of casein were allowed to swell in 525 grams of water for approximately one hour. At the end of this time 7.5 grams of powdered skimmed milk and 7.5 grams of sodium benzoate were added, with stirring, and immediately thereafter 120 cc's of concentrated 28% ammonium hydroxide were slowly added with stirring. There was thus obtained a smooth uniform paste of ammonium caseinate. 1125 grams of polymeric n-butyl vinyl ether having an intrinsic viscosity of 0.5 were cold milled for 5 minutes in a Baker-Perkins or Werner-Pfleiderer mixer and the ammonium caseinate paste was slowly added thereto during the course of 12 minutes. On completion of the addition of the ammonium caseinate paste, an inversion took place, resulting in the formation of a stiff white paste which was then diluted by the portionwise addition of 895 grams of water. The thus-obtained mixture was found to be stable on storage and when added to further amounts of water was readily mixed therewith.

Numerous agricultural sprays containing such toxic substances as lead arsenate, basic copper carbonate, sulfur, and the like, were prepared and the above-concentrated dispersion incorporated therein in amounts equivalent to from ½ lb. to 2 lbs. per 100 gallons of spray. On applying the thus-obtained sprays to a wide variety of plants, it was found that a substantially increased initial deposit of active insecticide or fungicide was obtained on the sprayed foliage and that the spray withstood weathering much better than sprays containing other sticking agents, such as animal and vegetable glues. The thus-obtained dispersion, diluted with water so as to correspond to a concentration of from ½ lb. to 2 lbs. thereof per 100 gallons of water, was tested on a wide variety of plants and was found to be non-toxic to the foliage and without any noticeable adverse effect on the plants.

It should also be noted that the relative proportions of ingredients specified in the foregoing examples should not be varied to any great extent in order to obtain a stable dispersion of polyvinyl ether which can readily be incorporated in agricultural sprays. Thus, the final concentrated dispersion should contain from 40 to 45% of polyvinyl ether and the amount of casein employed in preparing the dispersing paste for the final ether should be between 10% and 15% by weight of the amount of vinyl ether and an amount of powdered skimmed milk equal to from 5-10% by weight of the casein should be incorporated in the dispersing paste in order to prevent coagulation of the polyvinyl ether when the dispersion is incorporated in many types of agricultural sprays. Similarly, the amount of preservative for the casein, such as sodium benzoate, should be from 5% to 10% by weight of the amount of casein employed in preparing the dispersing paste.

I claim:

1. A concentrated normally-stable aqueous dispersion of a polymeric lower alkyl vinyl ether containing from 3 to 4 carbon atoms in the alkyl group and having an intrinsic viscosity of from 0.5 to 1.0, which is adapted for use in agricultural sprays as a sticking agent, which comprises from 40-45% by weight of said polymeric vinyl ether and a dispersing agent having as its essential ingredient ammonium caseinate, said dispersing agent containing an amount of casein equal to 10-15% of the weight of said polyvinyl ether, an amount of skimmed milk solids equivalent to from 5-10% of the weight of said casein and a preservative for said casein in an amount equivalent to from 5-10% of the weight of said casein, the balance of said composition being water.

2. The process of preparing a concentrated, normally stable aqueous dispersion of a polymeric lower alkyl vinyl ether containing from 3 to 4 carbon atoms in the alkyl group and having an intrinsic viscosity of 0.5 to 1.0, which is suitable for use as a sticking agent in agricultural sprays, which comprises cold milling said polyvinyl ether, preparing a dispersing agent by swelling an amount of casein equal to 10 to 15% by weight of said polyvinyl ether in an amount of water equal to about one-half the water required for preparing an aqueous dispersion of said polyvinyl ether in which said polyvinyl ether forms from 40 to 45% of the total mixture, adding to the swelled casein from 5 to 10% of the weight of said casein of dried skimmed milk solids and from 5 to 10% of the weight of said casein of a preservative for said casein, and thereafter adding concentrated ammonium hydroxide in an amount sufficient to solubilize said casein, adding the thus prepared ammonium caseinate paste to said polyvinyl ether while milling the same whereby there is formed a smooth, uniform paste of ammonium caseinate and said polyvinyl ether, permitting the thus-obtained mixture to invert and diluting the thus-obtained inverted mixture with water until the amount of said polyvinyl ether therein is within the range of 40 to 45% of the total mixture.

ARTHUR L. FOX.

REFERENCES CITED

The following references are of record in the file of this patent:

FOREIGN PATENTS

| Number | Country | Date |
|---|---|---|
| 107,235 | Australia | May 4, 1939 |